US006620452B1

United States Patent
Haddad et al.

(10) Patent No.: US 6,620,452 B1
(45) Date of Patent: Sep. 16, 2003

(54) FOOD ADDITIVES HAVING ENLARGED CONCENTRATION OF PHENOLICS EXTRACTED FROM FRUITS AND VEGETABLES AND PROCESS OF OBTAINING THE SAME

(75) Inventors: William F. Haddad, Santa Clarita, CA (US); Kenneth B. Shure, Santa Monica, CA (US); Zhong Liu, Temple City, CA (US)

(73) Assignee: American Fruit and Flavors, Pacoima, CA (US)

( * ) Notice: Subject to any disclaimer, the term of this patent is extended or adjusted under 35 U.S.C. 154(b) by 0 days.

(21) Appl. No.: 10/080,033

(22) Filed: Feb. 21, 2002

Related U.S. Application Data

(63) Continuation-in-part of application No. 09/566,211, filed on May 5, 2000, now Pat. No. 6,509,054.

(51) Int. Cl.[7] .......................... A23L 1/212; A23L 1/222
(52) U.S. Cl. ...................... 426/590; 426/478; 426/479; 426/599; 426/615; 426/648; 426/655
(58) Field of Search ................. 426/599, 590, 426/615, 648, 655, 478, 479

(56) References Cited

U.S. PATENT DOCUMENTS

| | | | | |
|---|---|---|---|---|
| 3,083,104 A | * | 3/1963 | Celmer ...................... 426/599 |
| 4,156,662 A | | 5/1979 | Wilson et al. |
| 4,698,360 A | | 10/1987 | Masquelier |
| 5,141,611 A | * | 8/1992 | Ford ......................... 426/330.3 |
| 5,354,429 A | | 10/1994 | Duncan et al. |
| 5,932,623 A | | 8/1999 | Tanabe et al. |
| 5,989,557 A | | 11/1999 | Bombardelli et al. |
| 6,086,910 A | * | 7/2000 | Howard et al. ............. 424/442 |
| 6,298,859 B1 | * | 10/2001 | Kierulff et al. ............. 131/297 |
| 2001/0001676 A1 | * | 5/2001 | O'Reilly ..................... 426/330 |

OTHER PUBLICATIONS

Pearson, et al., "Apple Juice Inhibits Human Low Density Lipoprotein Oxidation", in Life Sciences 1999, vol. 64, No. 21, pp 1913–1920.
VINOX (Grape Seed Extract) Technical Publication I by Polyphenolics, Inc.

* cited by examiner

*Primary Examiner*—Helen Pratt
(74) *Attorney, Agent, or Firm*—Gabor L. Szekeres

(57) ABSTRACT

Plant phenolics are extracted from macerated fruits and vegetables, particularly from apple peels and apple cores, by agitating the macerated fruit material with hot water of sufficiently high temperature to deactivate naturally present polyphenol oxidase enzyme. The aqueous extract of plant phenolics is separated from the bulk of solid fruit material by physical means, such as filtration. The aqueous extract is treated with pectinase enzyme to remove substantially all pectin, where after the pectinase enzyme is deactivated by heat. The plant phenolics are adsorbed from the depectinized aqueous extract by treatment with solid polyvinylpolypyrrolidone (PVPP) adsorbent, and the plant phenolics are eluted from the adsorbent by treatment with a nutritionally acceptable base, such as sodium hydroxide. The resulting aqueous solution of plant phenolics is concentrated or spray-dried and the resulting concentrated liquid or solid products are used as food supplements, and as additives to beverages and other food items, to provide the beverage or food item with a quantity of plant phenolics which is at least comparable to and which may exceed the plant phenolic contents of natural apple juice.

11 Claims, 1 Drawing Sheet

Figure 1:
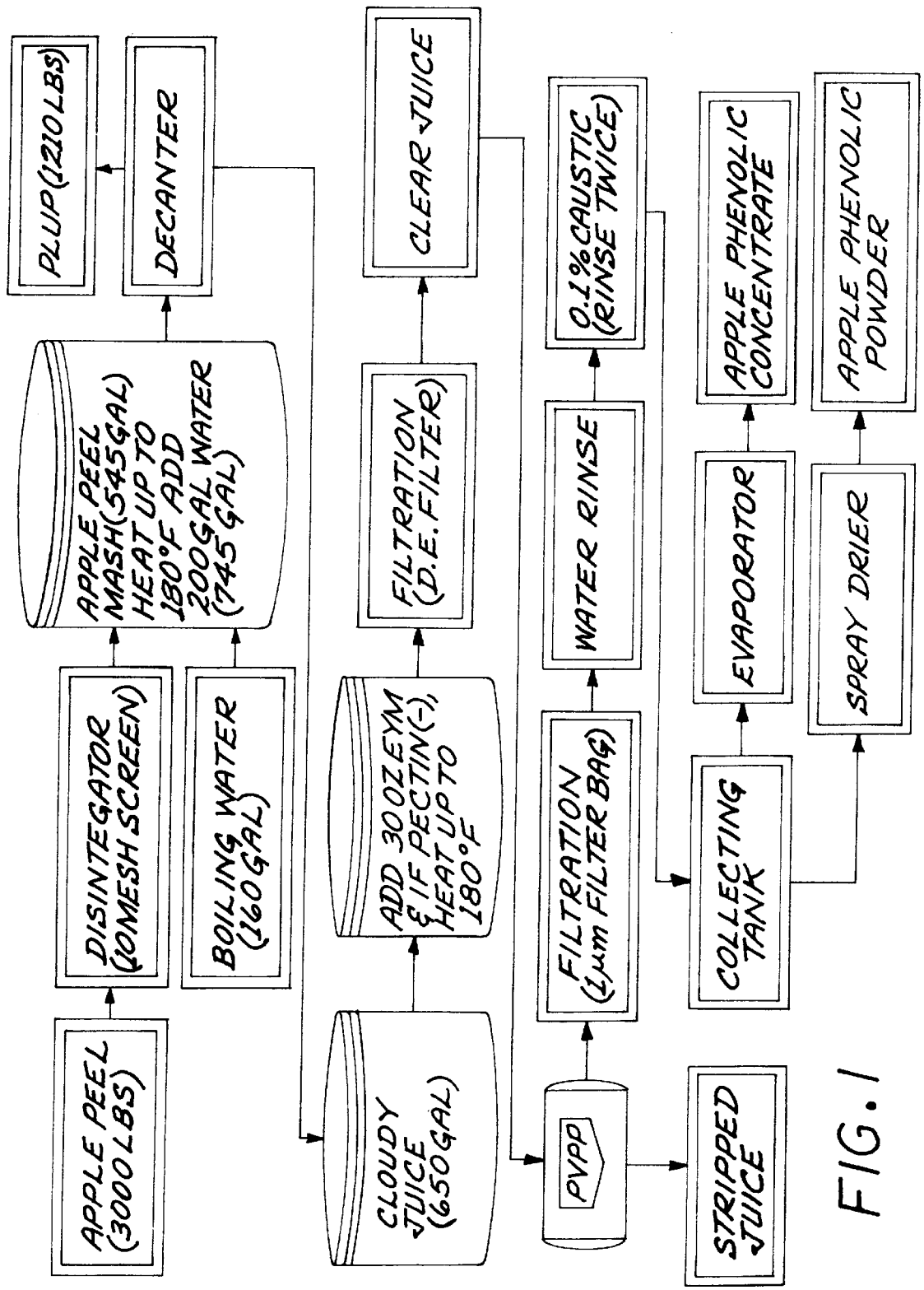

FOOD ADDITIVES HAVING ENLARGED CONCENTRATION OF PHENOLICS EXTRACTED FROM FRUITS AND VEGETABLES AND PROCESS OF OBTAINING THE SAME

CROSS-REFERENCE TO RELATED APPLICATION

The present application is a continuation-in-part of application Ser. No. 09/566,211 filed on May 5, 2000, now U.S. Pat. No. 6,509,054.

BACKGROUND OF THE INVENTION

1. Field of the Invention

The present invention is in the field of food additives in the form of products which contain extracts of fruits having enlarged concentrations of naturally occurring phenolics. More particularly the present invention is in the field of products and additives to foods which products contain extracts of apples having enlarged concentrations of phenolics. The present invention also relates to the process of obtaining products used as food additives having enlarged concentrations of phenolics, the process involving extraction of phenolics from fruits, particularly from apples.

2. Brief Description of Background Art

It has been known in the prior art that certain compounds or ingredients, present in fruits, particularly in grapes and apples, possess various benefits for human health apart from the well known benefits of vitamins, minerals and other nutrients considered to be the main ingredients of fruits. The terms "phenolics" or "plant phenolics" have been developed and been adopted in the art for a class or type of these compounds because these compounds include in their formula a hydroxyl (OH) function attached to an aromatic carbon atom in analogy to the well known chemical phenol, or these compounds have a chemical structure closely related to or derived from a compound having an aromatic (phenolic) hydroxyl group. Usually plant phenolics have more than one aromatic (phenolic) hydroxyl group. Generally speaking, plant phenolics have antioxidant properties and have been shown in in vitro and in in vivo studies to have positive effects on the human cardio-thoracic condition. The phenolics isolated from fruits, primarily from apples, include gallic acid, flavan-3ols, flavonols, phloridzin, cinnamates, hydroxymethyl furfural and anthocyanins. A publication titled "VINOX™ (Grape Seed Extract) Technical Publication I" by Polyphenolics, Inc., Burlingame Calif., describes the health benefits obtained as a result of consumption of phenolics and related compounds found in grapes and wine (particularly red wine), and identifies by chemical structure several phenolic compounds found in grape seeds. Apples are a rich and well known source for phenolics, and the phenolics are primarily concentrated in the peel. A publication by Pearson et al. titled "Apple Juice Inhibits Human Low Density Lipoprotein Oxidation", in *Life Science*, Volume 64 No. 21, 1999 describes human health benefits provided by the consumption of phenolics in apple juice.

U.S. Pat. No. 5,932,623 describes a process for obtaining extracts from unripe fruits and purports to identify the polyphenol products which are in the extract. U.S. Pat. No. 5,989,557 discloses an extract obtained from tea. U.S. Pat. Nos. 4,156,662 and 5,354,429 relate to extraction of aromas and other chemicals from plants or feed stocks of petroleum processing.

Because of the richness of apples as a source of plant-phenolics and because of the availability of apple peel and core as a relatively economical raw material, efforts in accordance with the present invention to produce isolates containing high concentration of phenolics have been focused on apple peel and apple core serving as a source.

SUMMARY OF THE INVENTION

It is an object of the present invention to obtain from fruits, and particularly from apples, an extract which is rich in natural phenolics of the fruit and which is utilized as a supplement or additive in various food products.

It is another object of the present invention to obtain from fruits, and particularly from apples, an extract which is rich in natural phenolics of the fruit and which does not impart an unnatural or undesired taste component to the food product in which it is used. It is still another object of the present invention to provide food products such as beverages, dairy products, frozen products, jams, jellies, preserves, and confectionary products which have an enlarged concentration of phenolics that have been extracted from fruits, particularly from apples, in accordance with the present invention.

The foregoing objects and advantages are attained by a product or products that is obtained by extracting the fruit, or parts of the fruit such as peels and or cores with hot water in a temperature range of approximately 65 to 93° C. (150 to 200° F.), followed by depectinization of the extract with a pectinase enzyme, preferably at an elevated temperature of approximately 38 to 57° C. (100 to 135° F.) until test taken for pectin is substantially negative. The pectinase enzyme is then deactivated by heating the mixture to approximately 60 to 93° C. (140 to 200° F.) and the aqueous solution/suspension is filtered to yield discardable solids and an aqueous filtrate. Polyvinylpolypyrrolidone (PVPP) adsorbent is then added to the filtrate aqueous solution and the mixture is agitated to extract by adsorption of the plant phenolics contained in the aqueous phase. The polyvinylpolypyrrolidone (PVPP) adsorbent containing adsorbed plant phenolics is then collected by filtration, centrifugation or like method. The aqueous filtrate at this stage is substantially devoid of recoverable plant phenolics but after concentration can still serve as useful product, primarily as a delivery vehicle for the plant phenolics obtained by the following additional process steps.

The collected solid polyvinylpolypyrrolidone (PVPP) adsorbent containing adsorbed plant phenolics is then washed multiple times with water to remove solids other than the adsorbed plant phenolics. The plant phenolics are obtained from the PVPP adsorbent by treating the adsorbent with dilute sodium hydroxide (or other acceptable strong base) solution, to give an aqueous extract of the plant phenolics, having a concentration of approximately 400 to 5000 mg gallic acid equivalent per liter (GAE/L) of the extract. The polyvinylpolypyrrolidone (PVPP) adsorbent recovered by filtration can be regenerated for repeated use by careful washing with water until all base is substantially removed from it.

The aqueous extract containing the plant phenolics can be further concentrated to give a liquid product with greater concentration of plant phenolics. Alternatively the aqueous extract is mixed with a nutritionally acceptable carrier, such as maltodextrin, rice dextrin, modified corn starch or other carrier, and the mixture is converted to a solid by spray drying or like drying process effective to yield a solid product. When in a solid form, such as the spray dried product obtained from the aqueous extract, the concentration of phenolics depends on the amount of carrier (if any) or carriers added and on the moisture content of the solid. Preferably the spray dried solid product contains approximately 10 mg or more gallic acid equivalent (GAE) per gram of solid (1% by weight). When the aqueous extract is concentrated but not dried completely, it typically contains approximately 50,000 to 200,000, preferably approximately 100,000 mg GAE/L.

The liquid concentrate, dried solid product or their solutions can be added to diverse types of food products, such as beverages, dairy products, frozen products, jams, jellies, preserves, and confectionary products to provide or enrich the products with fruit phenolics.

The features of the present invention can be best understood together with further objects and advantages by reference to the following description, taken in connection with the accompanying drawings.

BRIEF DESCRIPTION OF THE DRAWING FIGURE

FIG. 1 is a chart of block diagrams, showing the presently preferred embodiment of the process of the invention, illustrating the products obtained in the process of the invention.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventors for carrying out their invention in a commercial environment, although it should be understood that various modifications can be accomplished within the parameters of the present invention.

In accordance with the present invention naturally occurring phenolics are extracted from fruits, and a liquid or solid concentrate product is obtained which is significantly enriched in phenolics and which is utilized as an additive to various and diverse food items to provide the food item with a significant quantity of phenolics originating from the fruit. The terms "phenolics", "fruit phenolics" or "plant-phenolics" are used herein substantially interchangeably and in the manner normally used in food chemistry and related art. That is, these terms refer to non-toxic substances naturally occurring in plants (primarily in fruits with special emphasis on apples) and which have an aromatic hydroxyl group and react like gallic acid in various reactions and assays, such as the art-accepted Folin-Ciocalieau reaction or assay. As is known and is illustrated below, gallic acid is 3,4,5-trihydroxybenzoic acid, and the Folin-Ciocalteau reaction or assay is commonly used in the art to quantitatively measure phenolics, the amount or concentration of which is expressed in terms of equivalents to gallic acid (Gallic Acid Equivalent per liter; GAE/L). The phenolic compounds included in fruits, and extracted therefrom in accordance with the present invention include flavan-3ols, flavonols, phloridzin, cinnamates, hydroxymethyl furfural and anthocyanins.

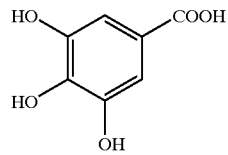

gallic acid, 3,4,5-trihydroxybenzoic acid

The process of the present invention may be practiced on any fruit that contains a substantial quantity of plant-phenolics so that the extraction process is worthwhile and economical. However, the primary source of plant-phenolics in accordance with the present invention comprises apples, the preferred embodiment of the process is practiced on apples and the preferred product contains plant-phenolics extracted from apples. Therefore, the process and products are hereinafter described with reference to the preferred embodiments which utilize apples as a source. Nevertheless, it should be understood that the invention per se is not limited to apples, rather it can be applied to any fruit, and any vegetable that contains a substantial quantity of plant-phenolics, comparable within 1 or 2 orders of magnitude to the quantity of phenolics contained in apples.

The fruit to be extracted, such as apple peel and apple cores are preferably macerated, ground or cut into small pieces prior to extraction so as to increase their surface area and render the extraction process more efficient. Apple peels and apple cores serve as particularly advantageous raw materials in accordance with the present invention, because the peels are known to be particularly rich in plant-phenolics, and because apple peels and cores are available at economical price. It is particularly economical to utilize apple peels which are a by-product of commercial apple processing as source of plant phenolics in accordance with the preferred embodiment of the present invention. If the apple peels obtained as by products of apple processing are not used immediately in the process of the present invention then the peels should be transported and stored chilled, preferably below 5° C. (40° F.) more preferably below −7° C. (20° F.) and even more preferably below −18° C. (0° F.).

Thus, after maceration, preferably into particles of approximately 2 mm$^3$ in volume in case of apple peels, the fruit particles (apple peels) are mixed with hot water, preferably boiling water at a ratio of 1 part of fruit particles (apple peel) to approximately 3 parts of water. The temperature of the mixture needs to be brought up quickly and for a short time to approximately 66 to 93° C. (150 to 200° F.), preferably to approximately 71 to 88° C. (160 to 190° F.), most preferably to approximately 77 to 82° C. (170 to 180° F.). This is best accomplished by injection of steam into the agitated mixture. Thereafter the agitated mixture is cooled to approximately 38 to 66° C. (100 to 150° F.), preferably to approximately 43 to 60° C. (110 to 140° F.), most preferably to approximately 49 to 55° (120 to 130° F.).

The step of bringing the mixture to the above noted high temperature (in the range of approximately 66 to 93° C.) is important to the whole process and is highly advantageous because in this temperature range the enzyme polyphenol oxidase which is naturally present in the extract, is deactivated and microbial activities are also reduced. The enzyme polyphenol oxidase is deactivated practically instantaneously as soon as the high temperature, for example the preferred 77 to 82° C. (170 to 180° F.) is reached, so that the length of time at which the mixture is held at the high temperature is not critical. Because degradation of plant phenolics by polyphenol oxidase is substantially avoided or at least significantly reduced due to deactivation of this enzyme by heat, a significantly greater percentage of plant phenolics can be ultimately recovered than what would otherwise be possible in the absence of this beat treatment. The hot water, first in the temperature range of 66 to 93° C. and after the aforesaid cooling in the temperature range of 38 to 66° C, efficiently extracts the plant phenolics from the fruit particles. The period of time during which the mixture is kept in the cooler temperature range of 38 to 66° C. is also not critical, in fact cooling to this temperature range is an intermediary step before the next depectinization step is conducted.

Because the polyphenol oxidase enzyme has already been deactivated by the higher heat, the extraction proceeds without exposure to this enzyme. Research has shown that when the process is conducted without first deactivating the polyphenol oxidase enzyme by exposure to high temperature (approximately 66 to 93° C.) then more than 30% of the extractable polyphenols are lost due to the activity of this enzyme. As far as the present inventors are aware, the step of extracting plant phenolics from fruits with hot water itself is unique, and the step of raising the temperature sufficiently to deactivate the polypenol oxidase enzyme is particularly novel and inventive, and, as described above, results in a significant advantage.

After the extraction process the intermediate product is an aqueous mixture containing the fruit particles as a pulp, with plant phenolics already having been extracted into the water as a solute. This intermediate product is depectinized by treating it with pectinase enzyme. Pectinase enzyme is commercially available and can be obtained from many sources. In the presently preferred process of the invention the commercial product PECTINEX™ Ultra SPL of Cellulo Co. of Fresno, Calif. is used. Sufficient pectinase enzyme is added to the intermediate product so that by the end of the treatment period tests for the presence of pectin in the product give negative results. Testing for pectin can be conducted in accordance with methods known in the art, for example by a method called "Alcohol Test for Residual Pectin in Fruit Juices" described in the book titled "Reference Manual for the Processed Apples Industry" published by Processed Apples Institute Inc., Atlanta, Ga. A person having ordinary skill in the art will know how to adjust the amount of pectinase enzyme and the length of the period of treatment with the enzyme for the type of pectinase enzyme actually used and for the amount of pectin which is originally present in the intermediate product.

In the presently preferred embodiment of the process of the invention, the commercial pectinase (Pectinex™ Ultra SP-L) is added into the mixture at a usage level of approximately 10 to 80 fluid oz/1000 gallons, preferably 25 to 65 oz/1000 gallons, most preferably 40 to 50 oz/1000 gallons, and the temperature is maintained at approximately 38 to 57° C. (100 to 135° F.), preferably at approximately 43 to 55° C. (110 to 130° F.), most preferably at approximately 49 to 52° C. (120 to 125° F.), for an optimal enzyme activity for 30 minutes to 8 hours, preferably 1 to 4 hours, most preferably 1.5 to 2 hours, until the test for pectin gives negative result.

After the pectin content of the mixture has been removed by treatment with pectinase, this enzyme is deactivated by heat. This is accomplished by heating the aqueous mixture to approximately 71 to 93° C. (160 to 200° F.), preferably to approximately 77 to 88° C. (170 to 190° F.), most preferably to approximately 82° C. (180° F.) to deactivate the pectinase enzyme.

Thereafter the aqueous suspension of pulp is separated by physical means into an aqueous phase and solids. This can be accomplished by using a decanter centrifuge, other type of centrifuge or filtration device. The solid pulp obtained in this manner is not useful for the purposes of the present invention and can be discarded. Alternatively, separation of the bulk of the pulp from the aqueous solution can also be accomplished after the step of extraction with hot water and before the step of treating the mixture with pectinase enzyme. This is shown in the chart of FIG. 1. After the step of separating the pulp by decantation, centrifugation or filtration the resulting aqueous solution is still cloudy due to small suspended particles. These are removed by filtration over diatomaceous earth (D. E.) filter, or any other conventional filter with sufficiently small pore size, such as 1 $\mu$m or less. The amount of water solution (water extract of plant phenolics) is usually approximately 50% –60% of the total weight of the macerated pulp plus the water which has been added to it. The dissolved solids content of this water extract is in the range of about 2% to 20%, more likely about 5% to 15%, most likely 8% to 12%, as measured by refractometer (Brix). Measuring solute concentrations in aqueous solutions and expressing the results in Brix is well known in the art. An art accepted method for measuring Brix is described on page 417 of the Official Methods of Analysis of the Association of Official Analytical Chemists (A. O. A. C. 14$^{th}$ Edition 1984) under the title "Solids/Soluble in Fruits and Fruit Products, refractometer Method, method #22.024.

In the next step of the process of the invention the plant phenolics are removed from the aqueous solution by adsorption of the phenolics by polyvinylpolypyrrolidone (PVPP) adsorbent. The polyvinylpolypyrrolidone (PVPP) adsorbent is commercially available. In the presently preferred process the product named DIVERGAN® RS BASF is used. In this step of adsorption approximately 1 to 20 grams per liter (g/l) (0.133 to 2.67 ounce per gallon ) preferably 2 to 10 g/liter (0.266 to 1.33 ounce per gallon ), most preferably 4 to 5 g/liter (0.534 to 0.668 ounce per gallon) of PVPP adsorbent is added to the water extract. The mixture is stirred at ambient temperature for 5 to 30 minutes, preferably 5 to 20 minutes, most preferably 5 to 10 minutes. About 40 to 90%, more likely 50 to 80%, most likely 60 to 70% of the polyphenol existing in the water extract is removed by the PVPP adsorption.

In order to recover the plant phenolics from the PVPP resin, the PVPP is first collected by filtration with an appropriate pore size based on the particle size of PVPP. About 70 to 100%, more likely 80 to 98%, most likely 90 to 95% of the PVPP resin can be collected by a careful filtration. The resulting filtrate is considered "stripped juice" because the bulk of dissolved plant phenolics have been removed from it. The stripped juice is considered a secondary product in accordance with the present invention. Nevertheless, it can be further processed, for example concentrated to contain solids of up to 50 to 75 Brix (preferably up to 60 to 73 Brix or most preferably up to 70 to 72 Brix). This stripped juice concentrate, particularly when it has been obtained from apples, can be used as a vehicle for the delivery of the plant phenolics in various applications.

The PVPP resin which contains the adsorbed plant phenolics is rinsed thoroughly with filtered water until the Brix of the rinse water reaches 5.0, preferably 3.0, most preferably less than 1.0. Rinsing with filtered water removes sugars which may be trapped by the PVPP resin. The rinse waters are usually discarded. To remove the adsorbed plant phenolics from the PVPP resin, it is treated with a basic solution, preferably sodium hydroxide (NaOH) solution having alkalinity in the range of pH 9 to 14, preferably pH 10 to 13, most preferably 11 to 12. As is known 0.001 N NaOH solution has a pH of 11. Instead of NaOH other strong alkaline substances which are acceptable for use in the food processing and related industries can also be used, although the use of NaOH is preferred. The ratio of the sodium hydroxide solution to the PVPP resin (volume by weight) is about 20:1, preferably 15:1, most preferably 10:1. Treatment of the PVPP resin with the above-described basic solution can be accomplished in approximately 15 to 30 minutes by mixing and agitating the resin with the basic solution. The basic solution elutes, i. e. removes the plant phenolics from the resin. The resin is thereafter washed or rinsed until it is free from base and these rinse waters are usually discarded.

The basic eluent from the resin (primary product) is an extract of plant phenolics and usually contains, before any further concentration, approximately 400 to 5000 mg GAE/L, more likely 1000 to 4000 mg GAE/L, most likely 2000–3000 mg GAE/L, plant phenolics. Since natural apple juice usually has a concentration of approximately 100 mg GAE per liter (as determined by the Folin-Ciocalteau assay) this primary product of the process of the invention is already significantly more concentrated in plant phenolics than natural apple juice. However, this primary product can also be further concentrated or dried to be utilized in food products, food supplements and nutritional supplements as described in more detail below. Although this primary product (eluent from the PVPP resin) is basic, it is normally not necessary to neutralize it to a neutral pH and it was found that the basic solution is more resistant to microbial infection than a similar solution of neutral pH. Nevertheless, optionally the solution can be neutralized by addition of a nutritionally acceptable acid, such as acetic acid or citric acid.

After elution of the plant phenolics with base, the PVPP resin can be regenerated by thoroughly washing it with water until the basic material is removed. The PVPP resin used in this process of the invention may be regenerated up to 2 to 20 times, more likely up to 5 to 15 times, most likely up to 8 to 10 times. The regenerated PVPP can be stored until next use.

In accordance with one preferred embodiment of the present invention the primary liquid product is concentrated in an evaporator to the concentration desired. In this manner a concentration of 50,000 to 200,000, preferably approximately 100,000 mg GAE/L is typically attained in the liquid concentrate.

In accordance with another preferred embodiment the primary liquid product is spray dried to provide a solid concentrated phenolics material. The spray drying process is best performed after a suitable carrier is added to the liquid, because without a carrier the concentrate of phenolics tends to be tacky, sticky and difficult to handle. Thus, the purpose of the carrier is to render the spray dried concentrate of phenolics less sticky, more manageable and to add bulk to the material. Suitable carriers for this purpose are maltodextrin, rice dextrin, modified corn starch, modified starch from other sources and edible gums. The presently preferred carrier is maltodextrin. Preferably the carrier is added to the primary liquid product in an amount which equals in weight with the weight of the liquid product, although a wide range of weight of the carrier relative to the weights of the liquid concentrate can be used. The liquid containing the added carrier is then spray dried to provide a solid concentrate of plant phenolics.

It will be recognized by those skilled in the art that instead of spray drying other like processes known in the food processing and related arts can also be used to obtain the solid plant-phenolics with added carrier from the primary liquid product. It will also be recognized by those skilled in the art that the concentration of plant phenolics in the spray-dried product depends not only on the concentration of plant phenolics in the liquid, but also on the amount of carrier which is added to the liquids prior to spray drying, and also on the residual moisture content of the solid spray dried product. Nevertheless, what is attained within the scope of the present invention is a solid product, a relatively small amount of which can be added to a food product (for example to a beverage) to enrich the food product with at least as much plant phenolics as would be available in a single serving of natural apple juice. As noted above, natural apple juice usually has a concentration of approximately 100 mg GAE per liter. The solid spray dried product obtained in accordance with the present invention usually has such a concentration of plant phenolics that approximately 1 gram of this solid product, when added to approximately 100 grams of a beverage (or other food) will provide at least the same concentration of plant phenolics as would be available in natural apple juice. This means that the solid material usually contains 10 mg of plant phenolics per gram, that is approximately 1 per cent by weight of plant phenolics or more are present in the solid material. Because, as noted above, the concentration of plant phenolics in the spray dried solid product depends on several factors such as the amount of added carrier and retained moisture, solid extracts of fruits in the nature of this spray dried product, having a concentration of approximately 0.2 weight percent or greater of plant phenolics (as measured by the Folin-Ciocalteau assay) are contemplated to be within the scope of the invention.

When the spray-dried solid product or the liquid concentrate from the primary liquid product are added to a food product that is not a liquid, such that the resulting concentration of plant phenolics cannot be readily expressed in terms of gallic acid equivalent per liter, then sufficient quantity of either of these products is added so as to provide a customary single serving of the food product with plant phenolics equivalent to approximately 5 to 20 mg of gallic acid. In other words sufficient quantity of the solid or liquid concentrate is added to the food product to provide a customary single serving of the food product with as much plant phenolics as is available in a single customary serving of natural apple juice.

The primary liquid product, its liquid concentrate or the spray dried solid product are used as additives or supplements in several and various types of foods and beverages, such as juices, baked goods, frozen foods, dairy products, jams, jellies, preserves, confectionary items and others. In most of these applications a slight opacity of beverages which may occur as result of adding spray dried solid product does not represent a problem. A particularly preferred use of these products is a cola beverage, containing cola flavor (Mutual Flavors Cola flavor C-470), high fructose corn syrup, water, carbon dioxide and a quantity of the spray dried product which is sufficient to provide a concentration of approximately 100 mg GAE/liter to the beverage, such as natural apple juice. Usually, approximately 1 gram of the spray dried product per 100 g of the beverage provides this concentration. Those skilled in the art will readily understand that a greater amount of the spray dried or of the liquid concentrate be added to any food product to provide a larger concentration or unit dose of plant phenolics than what would be available in natural apple juice.

The products of the present invention, the primary liquid, more preferably its liquid concentrate or the spray-dried product can also be packaged, distributed and used as a dietary of food supplement to provide plant phenolics to human users to be taken orally, and not as a component of a beverage or other food product. Thus, these solid and/or liquid products may be combined with pharmaceutically and nutritionally acceptable excipients to provide liquid droplets, gels, capsules, tablets or any other usual form of orally ingestible delivery vehicle, preferably in such quantity that a unit dose, such as a single tablet, capsule, gel capsule or the like of the formulation contains at least approximately as much plant phenolics as a single serving of natural apple juice would. This means that a single dose or unit of the formulation would contain approximately 5 to 20 mg or more of plant phenolics. Thus, in the exemplary situation of the solid spray-dried product having a concentration of 10 mg GAE per gram of solid product, the unit dose of the formulation would contain approximately 0.5 to 2 or more grams of the solid product and a pharmaceutically acceptable excipients.

A sensory evaluation of the products obtained in accordance with the present invention has revealed that the primary product that is the liquid extract containing plant phenolics, its concentrate and the solid product obtained from the primary product after addition of additives and spray drying, as well as the secondary product (stripped juice) have pleasant flavor and aroma. When added to apple juice in amount sufficient to raise the plant phenolics concentration of the apple juice 4-fold over the natural concentration no unpleasant off-flavor or off-taste was detected.

SPECIFIC EXAMPLE

Extraction

The block diagram of FIG. 1 illustrates the process of the herein described specific example. Apple peel and cores were acquired immediately after the peeling process. 1.5 ton (3,000 lb) of apple peels and cores were macerated in order to increase surface area for better extraction, using a commercial Reitz-angle disintegrator with a 10 mesh screen. Boiling water (160 gallons) was then added, and the mixture was heated with agitation in a suitable vessel and brought to approximately 82° C. (180° F.) to deactivate the polyphenol oxidase. Thereafter 200 gallons of more mater were added. This step is helpful for the practical reason that the additional water creates optimal conditions in the particular apparatus for decanting and thereby separating a substantial portion of the pulp from the liquid extract. The separated pulp plays no further role in the process of the invention. The extract obtained after the decanting step has an approximate volume of 630 gallons in the form of a cloudy liquid. Pectinase enzyme (30 ounce total) is then added and the mixture is agitated. Tests for pectin are conducted peridically and after the tests show that all pectin has been removed, the mixture is agitated and heated to approximately 82° C. (180° F.) to deactivate the pectinase enzyme. Thereafter the mixture is filtered through diatomaceous earth to give a clear liquid. Polyvinylpolypyrrolidone (PVPP) adsorbent 5 g/l (0.668 ounce per gallon) is added to the clear liquid and the mixture is agitated for approximately 5 to 30 minutes, after which the PVPPP resin is collected by filtration with a filter medium of fine pores (1 µm). The clear liquid obtained by filtration is "stripped juice," a secondary product of the process. The resin collected by filtration is washed with water several times, and the water is discarded. Then, the resin is treated with 01.% NaOH solution using approximately 1.0 liter of NaOH solution for each 100 g of resin for approximately 15 to 30 minutes. The resin is then collected by filtration and the treatment with the same volume 0.1% NaOH solution is repeated. The collected caustic solutions are combined. These contain the plant phenolics extracted from the fruit, and form the primary product of the process. After treatment with base, the PVPP resin is regenerated by washing with water until the water wash is base free. The collected primary product can be further concentrated to provide a "phenolic concentrate" or converted into a solid product by spray-drying.

Specific Applications

The liquid concentrated product is advantegously used in a beverage or any liquid product. When added to beverages which are per se substantially devoid of plant phenolics, then sufficient concentrate is added to result in a phenolic concentration equivalent to natural apple juice (approximately 100 mg GAE/l)

Cola Flavored Drink

The spray dried (or otherwise obtained) solid product may be used in any food or nutritional supplement. For example, approximately 1.0% by weight of the solid product, Mutual Flavors Cola flavor C-470, high fructose corn syrup, water and carbon dioxide provide a finished carbonated cola beverage containing plant-phenolics in concentration equivalent to natural apple juice.

Apple Juice, Fortified in Phenolics

Approximately 1.0% by weight of the solid product, apple juice concentrate and water provide reconstituted apple juice containing twice the phenolic content of natural apple juice.

Measurement of Plant-Phenolic Content

The Folin-Ciocalteau method is used to measure the phenolic content of the products using gallic acid as a standard. Total phenolic content was determined colorimetrically, using a Beckman DU-50 spectrophotometer. The molecular weight of gallic acid is 170.1. A standard solution of gallic acid at 0.01 M is made by completely dissolving with stirring 1.701 grams of gallic acid in 1 liter distilled water. Diluted solutions of gallic acid in millimolar concentrations ranging from 0.00 mM to 0.2 mM are created as standards from distilled water and this standard solution. A sodium bicarbonate solution of 0.71 M strength is made by dissolving 59.64 grams of the substance in 1 liter of distilled water.

Folin-Ciocalteau Assay 0.1 gram phenolic substance (plant extract) to be assayed is weighed out and diluted to 10 grams with water and further diluted with another 6 grams of 0.71 M sodium bicarbonate. This mixture is allowed to react with 0.1 gram Folin-Ciocalteau reagent for 2 hours. A colored complex develops during this reaction period. The colored reaction medium is then measured for absorbance at 660 nm using the spectrophotometer. By comparison with an absorbance versus gallic acid equivalent per liter (GAE/l) curve that has been obtained by measurement of the standard solutions (standard curve) the concentration of plant phenolics in the assayed product is obtained (expressed as mg Gallic Acid Equivalents (GAE)/Liter). The phenolic standard gallic acid, sodium bicarbonate, and Folin-Ciocalteau reagent were obtained from Sigma Chemical Company, St Louis, Mo.

What is claimed is:

1. A process for extracting plant phenolics from a fruit or vegetable, the process comprising the steps of:

macerating the fruit or vegetable into particles;

extracting the fruit or vegetable particles with water to yield an aqueous extract;

heating the aqueous extract to approximately 65 to 93° C. (150 to 200° F.) to deactivate polyphenol oxidase enzyme present in the extract;

separating the bulk of particles from the extract;

adding pectinase enzyme to the extract and treating the extract with the pectinase enzyme until tests for pectin show that substantially all pectin has been removed in the extract;

after removing the pectin present in the extract heating the extract to approximately 60 to 93° C. (140 to 200° F.) to deactivate the pectinase enzyme;

after deactivating the pectinase enzyme adding solid polyvinylpolypyrrolidone (PVPP) adsorbent to the extract and agitating the extract with said adsorbent for a substantial portion of the plant phenolics of the extract to become adsorbed by said adsorbent;

removing the adsorbent from the aqueous phase of the extract, and treating said adsorbent with solution of a nutritionally acceptable base to elute the adsorbed plant phenolics from said adsorbent, to yield an aqueous solution of plant phenolics of at least 400 mg gallic acid equivalent per liter concentration.

2. A process in accordance with claim 1 further comprising the step of reducing the aqueous solution of plant phenolics to dryness to provide a solid concentrate of plant phenolics.

3. A process in accordance with claim 2 further comprising the step of adding a carrier selected from the group consisting of maltodextrin, rice dextrin, modified starch and edible gums to the aqueous solution of plant phenolics before reducing the aqueous solution to dryness.

4. A process in accordance with claim 1 further comprising the step of concentrating the aqueous solution of plant phenolics by evaporation to provide a liquid concentrate of plant phenolics of at least 50,000 mg gallic acid equivalent per liter concentration.

5. A process in accordance with claim 1 wherein the nutritionally acceptable base is sodium hydroxide.

6. A process for extracting plant phenolics from apples the process comprising the steps of:

macerating the apples into particles;

extracting the apple particles with water to yield an aqueous extract;

heating the aqueous extract to approximately 65 to 93° C. (150 to 200° F.) to deactivate polyphenol oxidase enzyme present in the extract;

separating the bulk of particles from the extract;

adding pectinase enzyme to the extract and treating the extract with the pectinase enzyme until tests for pectin show that substantially all pectin has been removed in the extract;

after removing the pectin present in the extract heating the extract to approximately 60 to 93° C. (140 to 200° F.) to deactivate the pectinase enzyme;

after deactivating the pectinase enzyme adding solid polyvinylpolypyrrolidone (PVPP) adsorbent to the extract and agitating the extract with said adsorbent for a substantial portion of the plant phenolics of the extract to become adsorbed by said adsorbent;

removing the adsorbent from the aqueous phase of the extract, and treating said adsorbent with solution of a nutritionally acceptable base to elute the adsorbed plant phenolics from said adsorbent, to yield an aqueous solution of plant phenolics of at least 400 mg gallic acid equivalent per liter concentration.

7. A process in accordance with claim 6 further comprising the step of reducing the aqueous solution of plant phenolics to dryness to provide a solid concentrate of plant phenolics.

8. A process in accordance with claim 7 further comprising the step of adding a carrier selected from the group consisting of maltodextrin, rice dextrin, modified starch and edible gums to the aqueous solution of plant phenolics before reducing the aqueous solution to dryness.

9. A process in accordance with claim 8 further comprising the step of concentrating the aqueous solution of plant phenolics by evaporation to provide a liquid concentrate of plant phenolics of at least 50,000 mg gallic acid equivalent per liter concentration.

10. A process in accordance with claim 6 wherein the nutritionally acceptable base is sodium hydroxide.

11. A process in accordance with claim 6 wherein the apples include peels and cores, and wherein in the step of macerating, apple peels and cores are macerated.

* * * * *

UNITED STATES PATENT AND TRADEMARK OFFICE
CERTIFICATE OF CORRECTION

PATENT NO. : 6,620,452 B1
DATED : September 16, 2003
INVENTOR(S) : Haddad et al.

It is certified that error appears in the above-identified patent and that said Letters Patent is hereby corrected as shown below:

Title page,
Item [73], Assignee, "American Fruit and Flavors," should be -- American Fruits and Flavors --

Column 1,
Line 48, "Calif.," should be -- California, --

Signed and Sealed this

Thirteenth Day of April, 2004

JON W. DUDAS
*Acting Director of the United States Patent and Trademark Office*